(12) United States Patent
Sitbon (10) Patent No.: US 8,589,232 B2
(45) Date of Patent: Nov. 19, 2013

(54) ADVERTISING METHOD AND SYSTEM WITH USE OF MULTI-SCREENED COMPUTER MONITOR UNITS

(75) Inventor: David Eduard Sitbon, Beer Sheva (IL)

(73) Assignee: U-SEE 2 Limited, Limassol (CY)

( * ) Notice: Subject to any disclaimer, the term of this patent is extended or adjusted under 35 U.S.C. 154(b) by 969 days.

(21) Appl. No.: 12/519,343

(22) PCT Filed: Dec. 17, 2007

(86) PCT No.: PCT/IL2007/001557
§ 371 (c)(1),
(2), (4) Date: Jul. 1, 2009

(87) PCT Pub. No.: WO2008/075343
PCT Pub. Date: Jun. 26, 2008

(65) Prior Publication Data
US 2010/0094705 A1    Apr. 15, 2010

(30) Foreign Application Priority Data
Dec. 18, 2006  (IL) .......................................... 180149

(51) Int. Cl.
*G06Q 30/00*  (2012.01)
(52) U.S. Cl.
USPC .................................... 705/14.65; 705/14.4
(58) Field of Classification Search
USPC ............................................ 705/14.65, 14.4
See application file for complete search history.

(56) References Cited

U.S. PATENT DOCUMENTS

| | | |
|---|---|---|
| 5,767,897 A | 6/1998 | Howell |
| 5,796,577 A | 8/1998 | Ouchi et al. |
| 5,856,819 A | 1/1999 | Vossler |
| 6,094,341 A | 7/2000 | Lin |
| 6,259,038 B1 | 7/2001 | Sakaguchi et al. |
| 6,295,038 B1 | 9/2001 | Rebeske |
| 6,571,279 B1 * | 5/2003 | Herz et al. .................... 709/217 |
| 6,670,950 B1 | 12/2003 | Chin et al. |
| 6,778,383 B2 | 8/2004 | Ho |
| 6,917,348 B2 | 7/2005 | Demsky et al. |
| 2001/0054986 A1 | 12/2001 | Leman |
| 2002/0109662 A1 | 8/2002 | Miller |
| 2002/0135584 A1 * | 9/2002 | Lee ............................... 345/531 |
| 2004/0051679 A1 | 3/2004 | Ponx |
| 2004/0113935 A1 | 6/2004 | O'Neal et al. |
| 2007/0136134 A1 * | 6/2007 | Moscovitch .................... 705/14 |
| 2011/0193780 A1 * | 8/2011 | Schaaf .......................... 345/163 |

FOREIGN PATENT DOCUMENTS

| | | |
|---|---|---|
| DE | 3315025 A1 | 11/1983 |
| DE | 19800376 A1 | 7/1999 |

(Continued)

*Primary Examiner* — Michael Bekerman
(74) *Attorney, Agent, or Firm* — Marsteller & Associates, P.C.

(57) ABSTRACT

An advertising method and system with use of multi-screened computer monitor units is disclosed. A server having a database in which is stored a plurality of advertisement software packages is in data communication with a network of interconnected computers, each of which is associated with a multi-screened monitor unit having an agent side and at least one oppositely facing client side. After a request for an advertisement is initiated, an advertisement software package is retrieved from the database according to predetermined selection rules and transmitted to a target computer. A corresponding advertisement image is displayed on a client side of the monitor unit while the agent is able to view other images on the agent side of the monitor unit. In one embodiment, the multi-screened monitor unit receives VGA data and USB video data from the target computer and transmits the same to the agent and client sides, respectively.

33 Claims, 8 Drawing Sheets

FOREIGN PATENT DOCUMENTS

| | | |
|---|---|---|
| EP | 0949557 A1 | 10/1999 |
| EP | 1134645 A1 | 9/2001 |
| EP | 1420336 A2 | 5/2004 |
| GB | 2153189 A | 8/1985 |
| WO | WO99/31649 A1 | 6/1999 |
| WO | WO01/27800 A2 | 4/2001 |
| WO | WO 0127800 A2 * | 4/2001 |
| WO | 2005067479 A2 | 7/2005 |

* cited by examiner

ADVERTISING METHOD AND SYSTEM WITH USE OF MULTI-SCREENED COMPUTER MONITOR UNITS

FIELD OF THE INVENTION

The present invention relates to the field of display systems. More particularly, the invention relates to an advertising method with use of multi-screened computer monitor units.

BACKGROUND OF THE INVENTION

Many computers having two display screens are known from the prior art. For example, U.S. Pat. No. 5,796,577 and U.S. Pat. No. 5,856,819 disclose a bi-directional presentation device having a pair of screens facing in generally opposite directions, for displaying an image visible to an audience on both sides of the display device. US 2002/0109662 discloses a dual screen computer display consisting of two display panels which may face in opposite directions or in the same direction to provide an enlarged viewing area. U.S. Pat. No. 6,295,038 and US 2004/0051679 disclose a laptop computer having a first display screen that can be observed by an operator and a second display screen hingedly secured to the first screen, by which an observer of a presentation can see the same information viewed by the operator.

A dual screen computer display by which two different images are visible to different audiences, respectively, is also known to the prior art. U.S. Pat. No. 6,917,348 discloses a dual video display controller that has two separate output ports, which connect to two display units, respectively. In a dual image mode, one display unit displays a public area of a virtual scene, which is viewable by both the presenter and an audience. The second display unit displays both a public area and a private area, which is intended for viewing only by a presenter of images shown in the public area. U.S. Pat. No. 6,778,383 discloses an add-on display module for a portable computer having a secondary display device mounted in a frame. The secondary display device is detachably attached to a rear side of the primary display device by means of the mounting frame, so as to receive and display the image signal of the portable computer. Thus the secondary display device may show images that are different from the image shown on the primary display device. For example, the computer operator may do word processing that is viewable on the primary display device, while another person views a picture transmitted from the computer via the secondary display device for various applications such as business briefs, commercial advertisements, and lectures.

Although a person may view an advertisement on one face of a dual screen computer display while an operator views other images on a second face thereof, said advertisement is intentionally generated by the operator so that it may be viewed by a person participating in a front-to-front meeting. However, advertisements targeted to a specific individual and therefore associated with a sense of intimidation have less of an appeal to viewers than advertisements generated from a remote site which are targeted to an unknown audience.

It is an object of the present invention to provide a method of targeting an advertisement to an unknown audience by means of a dual screen computer monitor.

It is an additional object of the present invention to provide an advertisement to those who would normally not be viewing an advertisement.

It is an additional object of the present invention to provide an advertisement method by which the advertisement can be automatically changed.

Other objects and advantages of the invention will become apparent as the description proceeds.

SUMMARY OF THE INVENTION

The present invention provides a method of advertising with use of multi-screened computer monitor units. As referred to herein, a "computer monitor unit" is a set of monitors disposed on a common surface, e.g. a desk of an agent, on each of which can be displayed computer generated images. The images that are displayed on one screen may be identical, similar, or completely different than another screen of the same computer monitor unit. A computer monitor unit may include screens, e.g. two or three, that are in communication with corresponding video ports of the same computer, or may include screens, e.g. two or three, which are in communication with a corresponding video port of different computers. A computer will be considered "associated with" a screen of the same monitor unit even though it is not directly coupled to said screen.

The type of multi-screened computer monitor units that is used in conjunction with the method of the present invention is one that has oppositely facing screens, on each of which can be displayed different images. The term "oppositely facing screens" means two screens disposed at a relative angular spacing ranging from approximately 60-180 degrees. Since two different images can displayed on two screens of a multi-screened computer unit, a person can interact with the computer while viewing one set of images on one screen while advertisement-related images can be displayed simultaneously on the other screen. In this fashion, one side, e.g. the rear side, of a computer monitor unit can constitute an advertising medium for those who would normally not be viewing an advertisement, particularly those who are mentally and/or physically inactive while waiting to speak with an agent of an establishment. An "establishment" may be a commercial enterprise, a governmental organization, or a non-profit organization.

Two screens of the monitor unit will be referred herein as the "agent side" and the "client side", respectively. As referred to herein, a "client" is one that is able to view an advertisement on the client side of the monitor unit, and may be a current or potential client who is desirous of conferring with an agent concerning a product or service that is available from the establishment, or may be a bystander or passer by. When the client sits front-to-front with the agent and is able to view the client side of the monitor, the client may also be referred to a "participant" in a "meeting".

The method comprises the steps of:
a) providing a network of interconnected computers in data communication with a server having a database in which is stored a plurality of advertisement software packages, one or more of said computers being disposed in the vicinity of a corresponding agent desk and being associated with a multi-screened monitor unit having an agent side and at least one oppositely facing client side;
b) initiating a request for an advertisement;
c) retrieving an advertisement software package from said database according to predetermined selection rules;
d) transmitting said selected software package to a target computer;
e) generating an advertisement image from said selected software package; and
f) displaying said advertisement image on a client side of the monitor unit associated with said target computer while the agent is able to interface with, and view other images on the agent side of, said monitor unit.

In one embodiment of the invention, the step of initiating a request for an advertisement is carried out by a target computer, after which a request signal is transmitted to the server.

In one aspect, the step of initiating a request for an advertisement is carried out by providing a proximity sensor in data communication with a target computer, detecting the presence of a client in the vicinity of the agent desk corresponding to said target computer, and transmitting a detection signal to said target computer. The proximity sensor transmits a detection signal to the target computer after the client exits the agent desk and the target computer transmits a disable signal to the server whereby to terminate transmission of the selected software package to the target computer.

In one aspect, the step of initiating a request for an advertisement is carried out by interacting with a pointing device coupled to the target computer.

In one embodiment, the step of initiating a request for an advertisement is carried out by an internal command of the server which is generated at a predetermined time.

The predetermined selection rules are defined by a representative of an establishment in which the network of computers are located, and may be changed by the agent after entering a code indicative of the nature of a meeting between the agent and a client.

In one aspect, the generated advertisement image is constantly viewed by the client on a selected region of a client side of the monitor unit.

In one aspect, the generated advertisement image is suppressed by the agent during a meeting, and is displayed only when the agent is engaged in another activity in which the client is not involved and requests by means of a pointing device that the generated advertisement image be displayed on the client side of the monitor unit.

In one aspect, each monitor unit of the network displays a different advertisement.

In one aspect, clients who are sitting in a waiting area view advertisement images displayed on the client side of a desired monitor unit.

In one aspect, the displayed advertisement images changes after a client approaches the agent desk corresponding to the desired monitor unit.

In one aspect, a monitor unit is operable in an agent only mode, a uniform mode whereby the agent side screen and client side screen both display the same images, or in a dual mode, whereby in the dual mode the agent side screen displays images corresponding to received video graphics array (VGA) data and the client side screen displays images corresponding to received universal serial bus (USB) data.

The present invention is also directed to an advertising system with use of multi-screened computer monitor units, comprising:
  a) a server having a database in which is stored a plurality of advertisement software packages;
  b) a network of interconnected computers in data communication with said server, each of said computers being provided with a network card and with a dedicated software module for interfacing with a monitor unit; and
  c) a corresponding multi-screened monitor unit coupled to each of said computers, said multi-screened monitor unit having an agent side and at least one oppositely facing client side,
  wherein said server, following transmission thereto of a request for an advertisement, is adapted to retrieve an advertisement software package from said database according to predetermined selection rules and to transmit said selected software package to the network card of a target computer, the dedicated software module of said target computer being adapted to convert said selected software package into USB video data,
  wherein said multi-screened monitor unit comprises means for receiving VGA data from said target computer and for transmitting the same to said agent side, and means for receiving said USB video data and for transmitting the same to each of said client sides, images associated with said transmitted VGA data and with said transmitted USB video data being simultaneously displayable on said agent and client sides, respectively.

In a preferred embodiment, the multi-screened monitor unit comprises a control module for controlling the flow of USB control and video data received from said target computer, a switch module for delivering video data to a client side in response to the operation of said control module, a video splitter for splitting received VGA data into a first portion transmitted through a first line to said agent side and into a second portion transmitted through a second line to said switch module, a first USB segment extending from said control module to said switch module, and a second USB segment extending from said switch module to the client side screen.

Preferably, the multi-screened monitor unit further comprises means for selecting a desired mode of operation, corresponding USB control data being transmittable to the control module upon selection of the desired mode of operation.

The control module generates a disable signal and transmits the same to the switch module during an agent only mode to suppress the transmission of the VGA data via the second line.

The control module generates an enable signal and transmits the same to the switch module during a uniform mode to enable the transmission of the VGA data via the first and second lines simultaneously.

The control module generates a disable signal and transmits the same to the switch module during a dual mode, the USB video data being transmittable via the first and second USB bus segments to the client side.

The present invention is also directed to a multi-screened computer monitor unit capable of being coupled to a computer, comprising:
  a) a first screen;
  b) at least one oppositely facing second screen;
  c) a control module for controlling the flow of USB control and video data received from a computer;
  d) a switch module for delivering video data to each of said second sides in response to the operation of said control module;
  e) a video splitter for splitting received VGA data into a first portion transmitted through a first line to said first screen and into a second portion transmitted through a second line to each of said switch modules;
  f) a first USB segment extending from said control module to each of said switch modules;
  g) a second USB segment extending from each of said switch modules to a corresponding second screen; and
  h) means for selecting a desired mode of operation, corresponding USB control data being transmittable to said control module upon selection of the desired mode of operation,
  wherein said control module is adapted to generate a disable signal and to transmit the same to said switch module during an agent only mode to suppress the transmission of the VGA data via said second line,
  wherein said control module is adapted to generate an enable signal and to transmit the same to said switch module during a uniform mode to enable the transmission of the VGA data via said first and second lines simultaneously, wherein said control module is adapted to generate a disable signal and to transmit the same to each of said switch modules during a dual mode, the USB video data being transmittable via the first USB bus segment and each of second USB bus segments to each of said corresponding second screens, respectively, images associated with said VGA data and with said USB video data being simultaneously displayable on said first and second screens, respectively.

In one aspect, the first screen is stationary and the second screen is displaceable.

In one aspect, the second screen is angularly spaced from the first screen.

DETAILED DESCRIPTION OF PREFERRED EMBODIMENTS

The present invention is a novel method by which advertisements are targeted to the previously untapped audience of participants who are engaged in a front-to-front meeting or conferral with an agent of an establishment, such as a salesman or a bank clerk. The agent interfaces with a computer associated with a multi-screened monitor unit, such as a dual screened monitor unit, by which oppositely facing screens may present graphical or other visible information simultaneously to both the participant and the agent, as well known to those skilled in the art. The visible information displayed to the participant, which is generally relevant to the nature of the meeting or conferral, may be the same as, or different than, that displayed to the agent. Thus a participant is able to view images selected by the agent without having to lean, while sitting, in an awkward position over the table of the agent in order to view the displayed information. Invariably, there are lull periods for the participant when the agent is involved in another activity, such as answering a phone call or retrieving information from the computer. During those lull periods when the participant is generally physically and mentally inactive, advertisements are displayed on the participant side of the monitor and will catch the attention of the participant, encouraging the participant to consider purchasing the advertised product or service. Rather than being directly generated by the agent and thereby conveying a sense of intimidation to the participant which would detract from the appeal of the advertised product or service, the advertisements that are displayed on the participant side of the monitor are transmitted from a remote server and are therefore targeted to an unknown audience.

The computer of each agent of the establishment is connected by a data network, e.g. a local area network (LAN) or a wide area network (WAN), to a remote server. The remote server of a service provider having a working agreement with the establishment retrieves an advertisement software package, which is to be transmitted to each computer. The same advertisement software package may be transmitted to all computers of the establishment, or alternatively, one or more computers may receive different predetermined advertisement software packages, each of which is targeted for a unique audience of participants. The advertisement software package to be transmitted to a computer is selected by predetermined selection rules that are based upon, but not necessarily limited by, the product or service offered by the establishment, the specialty of the agent, and the subject matter of a meeting between an agent and participant.

Figure 4:
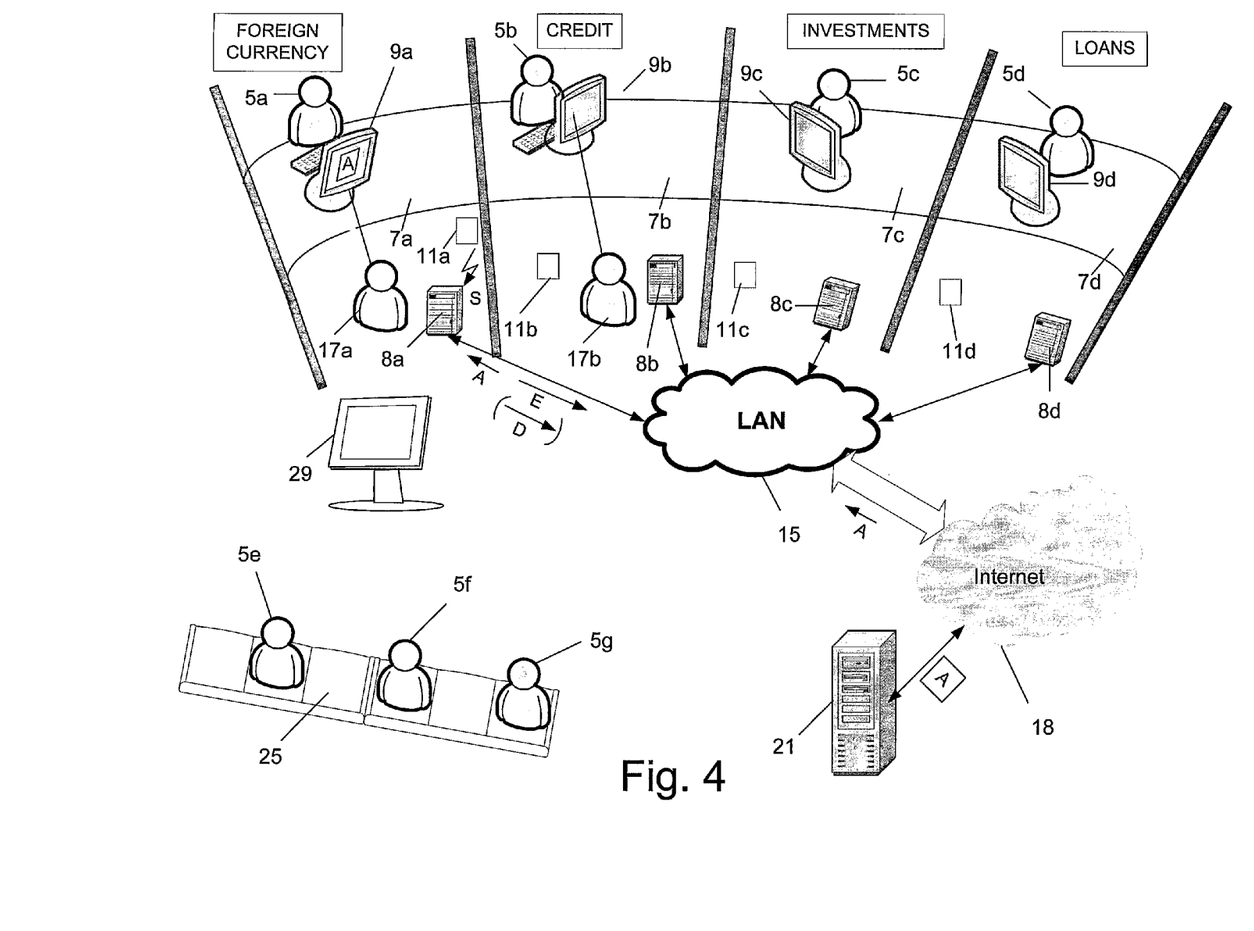
FIG. 4 is a schematic drawing of an advertising method according to one embodiment of the invention, illustrating an arrangement of a network of computers in an exemplary establishment.

FIG. 4 illustrates an exemplary arrangement of a network of dual screened computers. The illustrated establishment is a bank, and each of the agents 5a-d work in different departments, e.g. Foreign Currency, Credit, Investments, and Loans. On a desk 7a-d of each agent is deployed a corresponding dual screened monitor 9a-d having an agent side on which are displayed images corresponding to information entered by the agent and a participant side on which are displayed images approved by the agent to be viewed by the participant and/or advertisements generated by the remote server. Each computer 8a-d associated with a corresponding dual screened monitor 9a-d is interconnected to LAN 15, and LAN 15 in turn is in communication with service provider server 21 via Internet 18. Server 21 has a database in which are stored a plurality of advertisement software packages. Each advertisement software package is associated with one department. Server 21 is adapted to retrieve and transmit an advertisement software package that is relevant to the corresponding department manned by an agent 5a-d. For example, server 21 will retrieve and transmit advertisement software packages to computer 8c relating to various stocks that can be purchased with the help of agent 5c.

Proximity sensors 11a-d are disposed sufficiently close to the participant side of desks 7a-d, respectively, to detect when a participant approaches a corresponding agent 5a-d. Thus when a participant, e.g. participant 17a, approaches the corresponding desk 7a, the corresponding proximity sensor 11a transmits a detection signal S to the corresponding computer 8a which is indicative that a participant has approached the corresponding agent 5a. The corresponding computer 8a then transmits an enabling signal E to server 21, so that the latter will retrieve an advertisement software package suitable for the department associated with computer 8a. Advertisement software package A is then serially transmitted by server 21 to computer 8a, whereupon the latter is able to generate the images associated with advertisement software package A and to continuously display the same on the participant side of monitor 9a. The generated advertisement may be constantly viewed by participant 17a on monitor 9a, e.g. on a selected region thereof, or may be viewed by participant 17a only when agent 5a is engaged in another activity in which participant 17a is not involved and agent 5a has interacted with a pointing device, e.g. a mouse or a suitable key on his keyboard, for displaying the received advertisement software package. It will be appreciated that even though an advertisement is displayed on monitor 9a following interaction of agent 5a with his pointing device, agent 5a does not directly influence which advertisements are displayed, but rather requests by means of the pointing device that the received advertisement software package be displayed on the participant side of monitor 9a. As participant 17a views the displayed advertisement, agent may display images which are not viewable by participant 17a and which are not generated by a software package transmitted by server 21. Once participant 17a leaves desk 7a following completion of the conferral or meeting, proximity sensor 11a transmits another detection signal S to computer 8a and the latter transmits a disable signal D to server 21 to terminate the transmission of the advertisement software package.

Monitor 9c is viewable by clients 5e-g who are sitting in waiting area 25, e.g. a couch, and waiting to meet or confer with one of the agents 5a-d. When a participant has not approached desk 7c, the participant side of monitor 9c displays advertisements related to any of the bank departments while agent 5c continues his work and views images on the agent side of monitor 9c; however, when a participant approaches desk 7c, the advertisements that are displayed are related only to the corresponding department, e.g. Investments. Server 21 therefore transmits advertisement software packages that will be the most influential to the viewing audience. Alternatively, a single sided monitor 29, the computer of which is also interconnected to LAN 15, may constantly display to those clients that are in the waiting area advertisements related to any of the bank departments.

It will be appreciated that the advertising method of the present invention is equally applicable to any other establishment that employs a plurality of agents who are involved with meetings, consultations, or presentations with one or more participants in front-to-front fashion such that a participant is not able to view the images viewable on the agent side of a dual screened monitor. The agent may be a salesman who met a client in a showcase, for example, and then decided to present him with visible information by means of the dual screened monitor. An advertisement viewed by this client of the product or service already being discussed with the agent is not of much commercial value. To increase the commercial value of advertisements transmitted to participants, the agent may enter a code indicative of the nature of the meeting. The server will then transmit an advertisement software package of a product or service that is related to, but not identical to, the subject matter of the meeting. For example, a client who was interested in receiving information concerning a washing machine may view an advertisement concerning other home appliances. A client who was interested in receiving information concerning an expensive car generally has an inclination to purchase luxury items, and a commercially attractive advertisement to be viewed by such a client may be related to jewelry or exotic vacations. The database of the server categorizes the stored advertisement software packages with respect to each item of a list of products or services that are the subject matter of a meeting with an agent of a given establishment.

In another embodiment of the invention, an advertisement may be displayed on a client side of a multi-screened computer monitor unit to bystanders. An agent may work on his own computer and view images generated thereby on the agent side thereof. An advertisement viewable to bystanders or to passers by is displayed on the client side of the monitor, without disturbing the agent. In this embodiment, the advertisement need not be related to the work conducted by the agent. Thus the agent may be for example an electrical engineer who is designing a new product while an advertisement for a new movie is displayed on the client side of the monitor.

The advertising method of the present invention may be carried out with any suitable multi-screened computer monitor unit.

Figure 1:
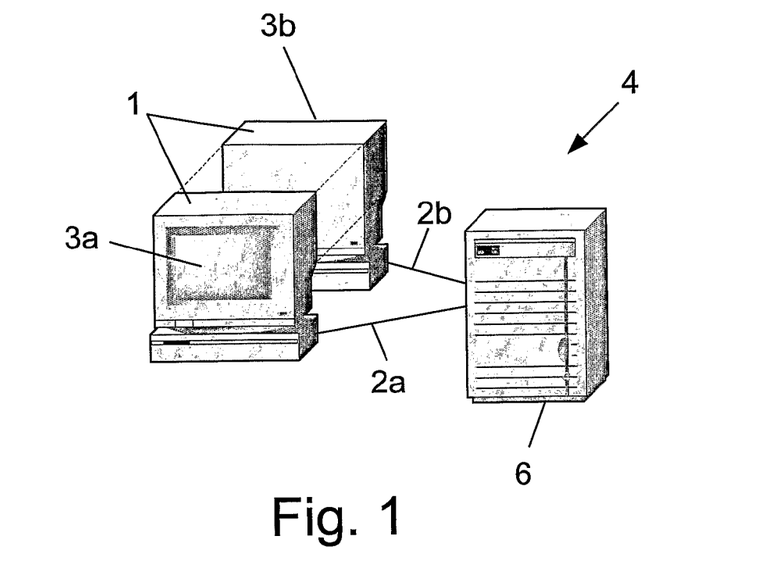
FIG. 1 is a perspective view of one embodiment of a computer monitor unit comprising two oppositely facing screens mounted in a common housing and in communication with a common computer.

FIG. 1 illustrates one embodiment of a multi-screened computer monitor unit, which is generally designated by numeral 4. Monitor unit 4 comprises two screens 3a and 3b which face in opposite directions, i.e. an angular spacing of 180 degrees, and computer 6. Screens 3a and 3b are mounted in a common housing 1, which is schematically shown in exploded fashion. Computer 6 generates two sets of images which are displayed on screens 3a and 3b, 1 respectively, by means of wires 2a and 2b, respectively, or by any other suitable data transmission medium.

Figure 5:
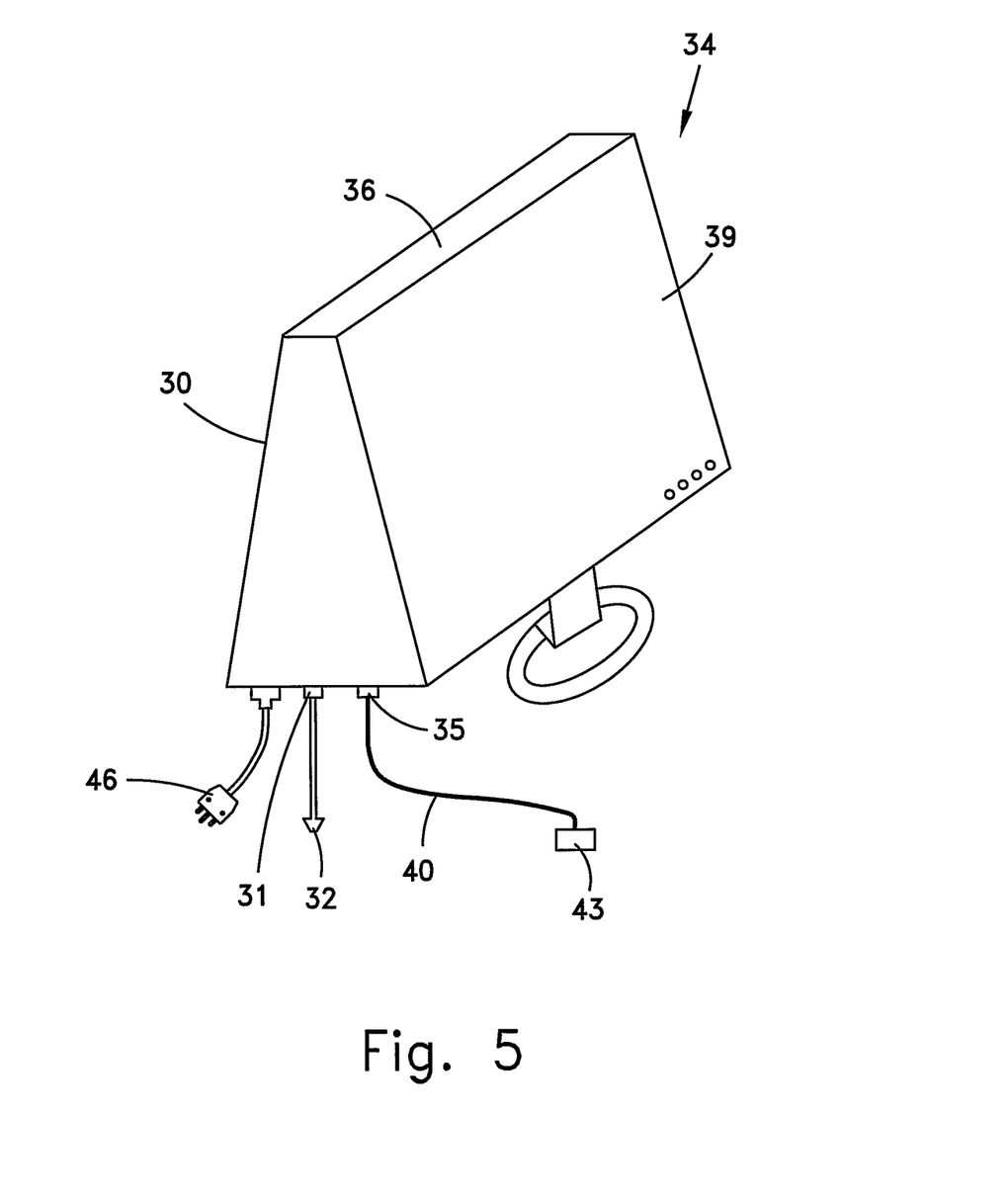
FIG. 5 is a perspective view of another embodiment of a computer monitor unit comprising two oppositely facing screens.

Alternatively, a multi-screened computer monitor unit 34 illustrated in FIG. 5. may comprise two screens 30 and 39 which face in opposite directions and which are mounted obliquely with respect to top surface 36 of the monitor unit.

Figure 2:
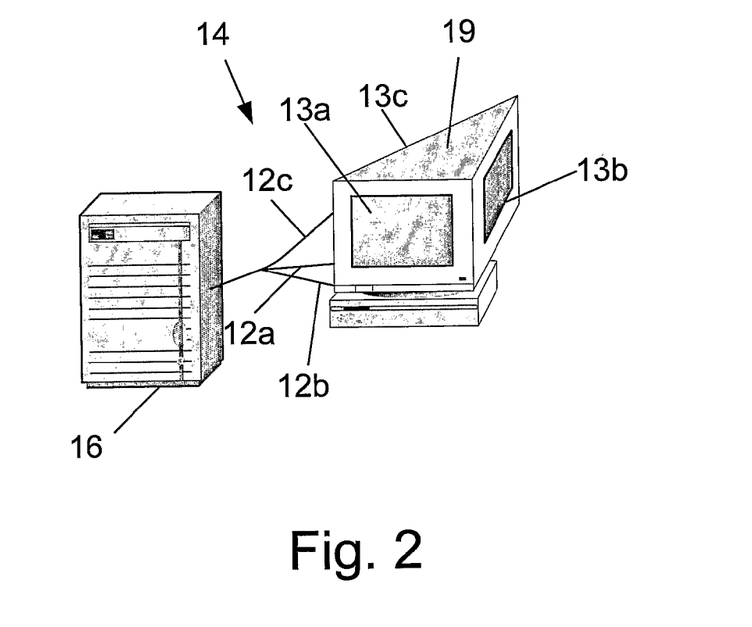
FIG. 2 is a perspective view of another embodiment of a computer monitor unit which comprises three screens mounted in a common triangularly shaped housing and in communication with a common computer.

FIG. 2 illustrates a monitor unit 14 comprising three screens 13a-c mounted in a common triangular housing 19 and angularly spaced by an angle of 60 degrees, and computer 16. Computer 16 generates three sets of images which are displayed on screens 13a-c, respectively, by means of wires 12a-c, 1 respectively, or by any other suitable data transmission medium. Similarly, a monitor unit having two screens may be mounted in a common triangular housing 19 such that the two screens are angularly spaced by an angle of 60 degrees, or by any other desired angle.

Figure 3:
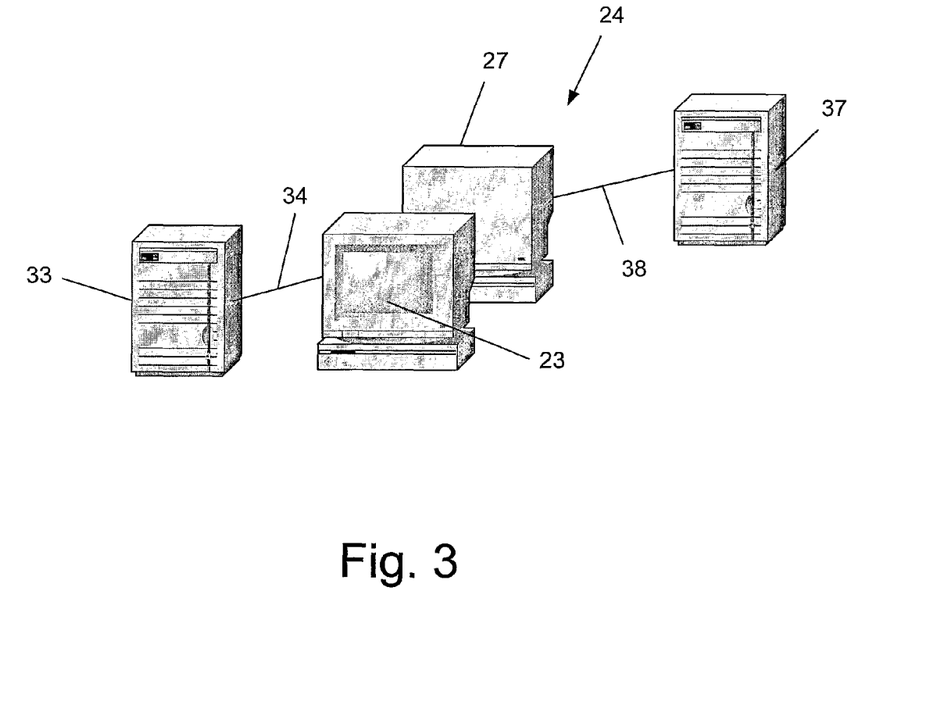
FIG. 3 is a perspective view of another embodiment of a computer monitor unit which comprises two oppositely facing screens in communication with different computers.

FIG. 3 illustrates a monitor unit 24 comprising two separated screens 23 and 27. Screens 23 and 27 face in opposite directions, e.g. at an angular spacing of 180 degrees, or of any other desired angular spacing, and are coupled to corresponding computers 33 and 37, respectively, by wires 34 and 38, respectively, in order to display different sets of images.

Figure 6:
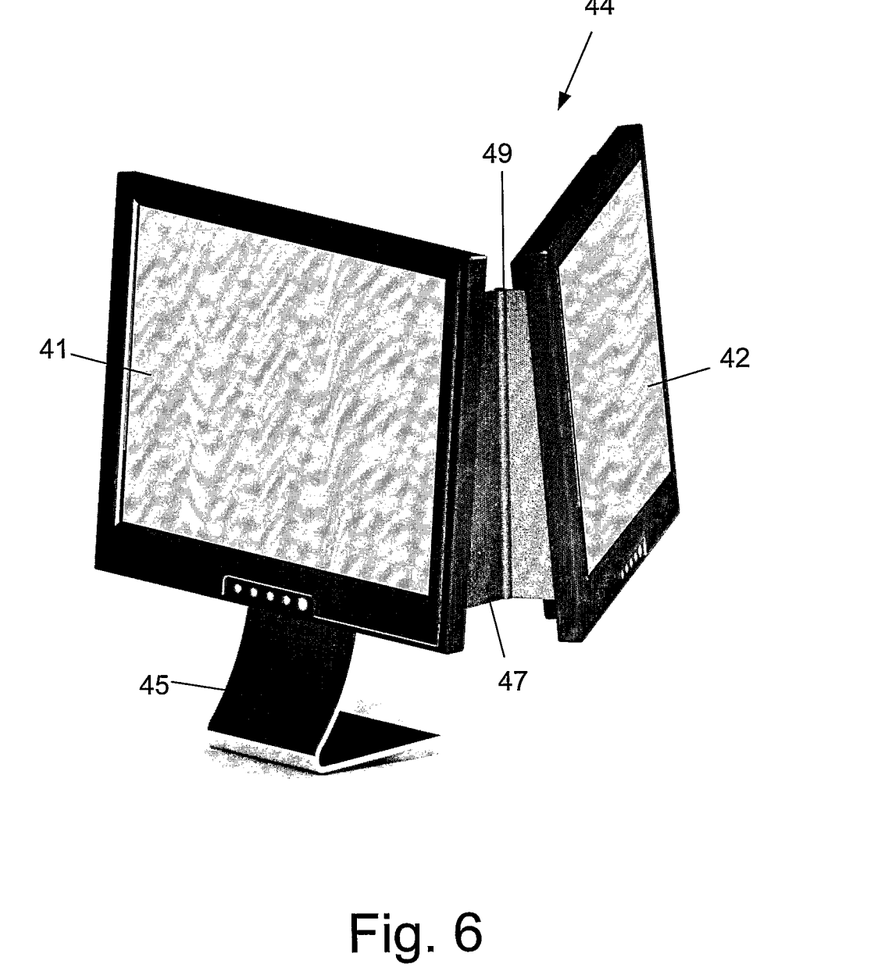
FIG. 6 is a perspective view of another embodiment of a computer monitor unit comprising a first stationary screen and a second displaceable screen.

FIG. 6 illustrates a monitor unit 44 which comprises a first stationary screen 41 and a second displaceable screen 42. Stationary screen 41 is supported by an underlying stand 45, which may be V-shaped as shown or configured in any other desired shape. A connecting element 47 extends from first stationary screen 41 to second displaceable screen 42, and is provided with a vertical pivot 49. By virtue of the pivotal screen 42 which may oriented at an angular distance of approximately 90 degrees, as illustrated, or any other convenient angular distance, from stationary screen 41, the participant may confer with the agent in a front-to-front meeting without interference from screen 42. However, during a lull period when the agent is involved in another activity, the participant may advantageously rotate second screen 42 about pivot 49 until the images displayed thereon are visible to the participant. A flexible cable (not shown) through which data is transmitted to screen 42 may be contained within connecting element 47.

Figure 7:
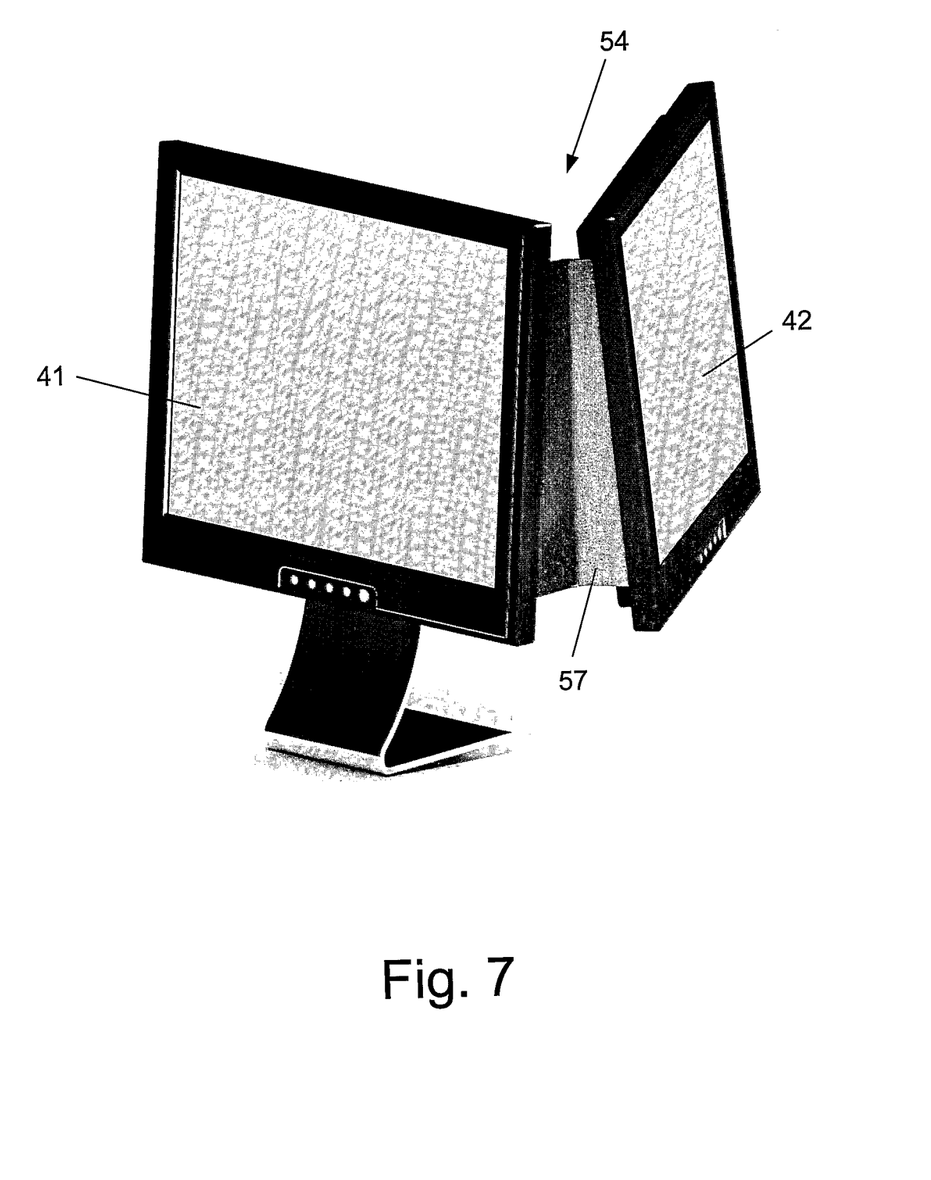
FIG. 7 is a perspective view of another embodiment of a computer monitor unit comprising two stationary screens that are separated by a fixed angular distance.

In FIG. 7, monitor unit 54 comprises a fixed connecting element 57 between screens 41 and 42. A client may sit at an angle of approximately 90 degrees from the agent and view advertisements while waiting to confer with the agent.

Figure 8:
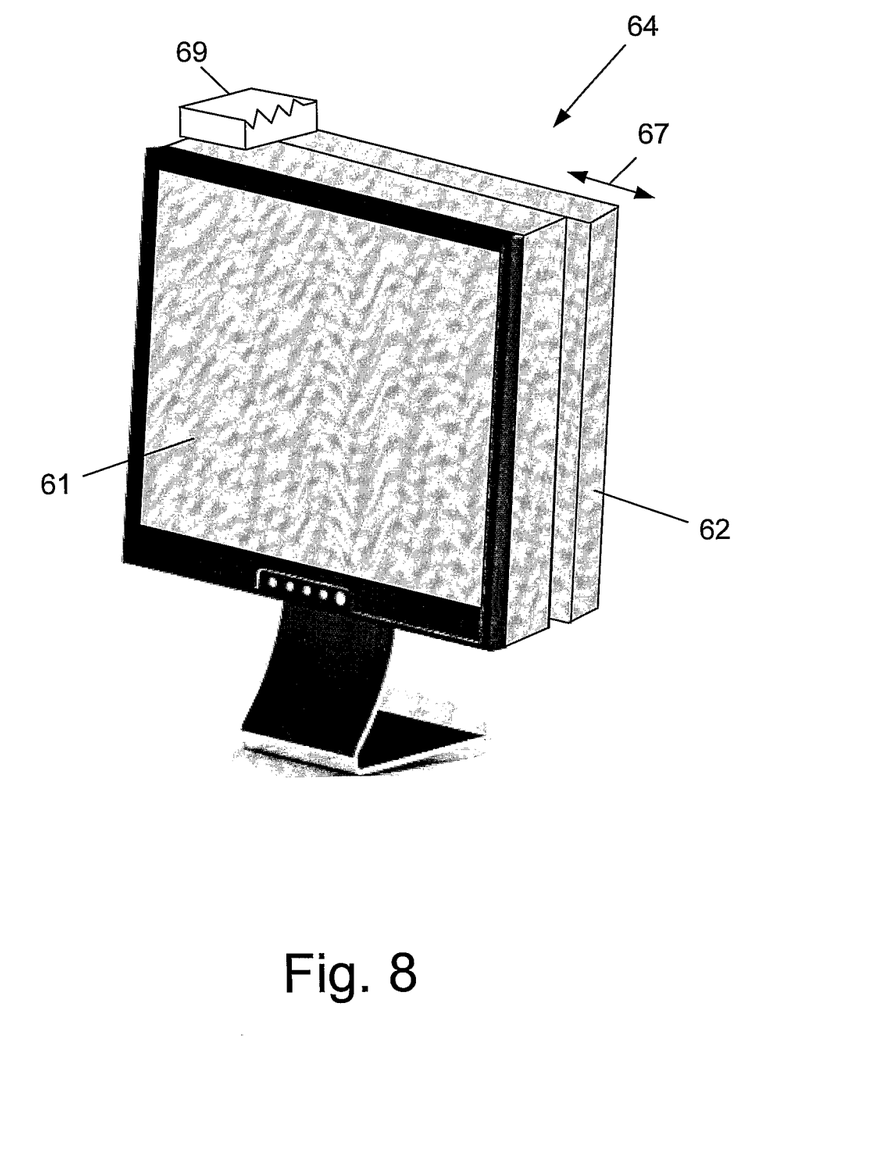
FIG. 8 is a perspective view of another embodiment of a computer monitor unit comprising a first stationary screen and a second axially slidable screen.

In FIG. 8, monitor unit 64 comprises a stationary first screen 61 and an oppositely facing second screen 62. Second screen 62 is axially slidable as shown by arrow 67 within a guide element 69, which is schematically shown in fragmented form and well known to those skilled in the art. Data may be transmitted to second screen by means of a flexible cable (not shown).

Figure 9:
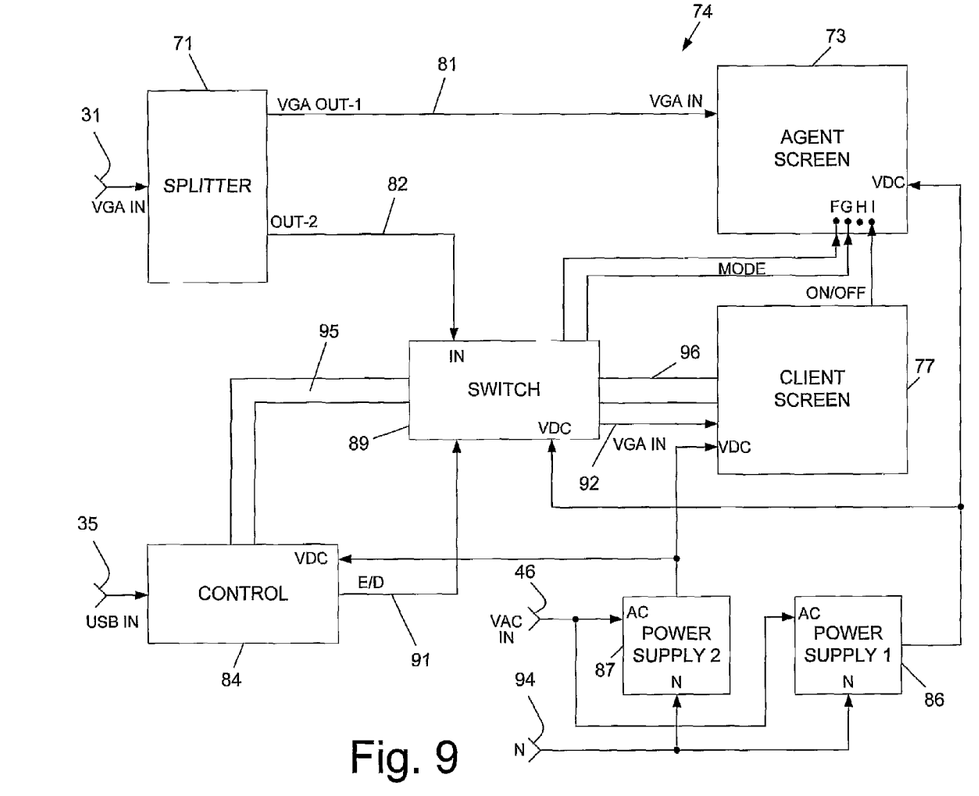
FIG. 9 is a block diagram of a multi-screened monitor unit according to another embodiment of the invention.

In the embodiment of FIG. 9, a block diagram of a multi-screened monitor unit 74 is illustrated. Monitor unit 74 is shown to comprise two screens, e.g. liquid crystal diode (LCD) screens, agent side screen 73 and client side screen 77, but it will be appreciated that any other suitable number of screens is possible.

Multi-screened monitor unit 74 is a self contained unit that can interface with any conventional computer without having to change the hardware of the computer, and can be embodied by any of the configurations illustrated in FIGS. 1-3 and 5-8. As also illustrated in FIG. 5, monitor unit 74 is shown to have a video input port 31 transmitted thereto by means of e.g. a D-type connector 32 from the video port of the computer, an input port 35 from one of the universal serial bus (USB) ports of the computer as transmitted thereto by cable 40 and connector 43, and plug 46 for supplying alternating current voltage (VAC). Suitable circuitry, as will be described hereinafter, is provided with monitor unit 34 to allow operation in three different modes: (1) an agent only mode whereby images are displayed only on the agent side screen; (2) a uniform mode whereby the same images are displayed on both the agent and client sides; and (3) dual mode whereby different images are displayed on the agent and client side screens.

Monitor unit 74 comprises a video splitter 71, which receives video graphics array (VGA) data from the computer with which the monitor unit is coupled via input port 31 and splits the VGA data into two lines 81 and 82. Control module 84 controls the flow of USB data received from the computer with which the monitor unit is coupled via input port 35. Switch module 89 delivers video data to client side screen 77 in response to the operation of control module 84. The USB data may be control data for commanding switch module 89 or video data by which an advertisement is displayed on client side screen 77. Video splitter 71, control module 84 and switch module 89 may be arranged on a single card or on separate cards. Each of the cards may be positioned on a suitable surface of the monitor unit. Screens 73 and 77 are supplied direct current (DC) voltage, e.g. 12 VDC, from power supplies 86 and 87, respectively, which in turn are powered by VAC. Control module 84 and switch module 89 are also powered by DC voltage.

A software program dedicated to generate the USB data delivered to input port 35, as well known to those skilled in the art, is stored within the computer. The software program has a standard interface for the operating system and allows limited manipulation thereof. The computer is also provided with a network card coupled to the motherboard, so that the software program will be able to convert the advertisement software package received from the remote server into USB video data.

During the agent only mode, control module 84 generates a disable command D, which is transmitted to switch module 89 via line 91, and switch module 89 in response suppresses video data to client side screen 77. Therefore only agent side screen 73 displays images, in response to the VGA data delivered thereto via line 81.

During the uniform mode, control module 84 generates an enable command E transmitted to switch module 89 via line 91, and switch module 89 in response transmits the VGA data received via line 82 to client side screen 77. The VGA data is delivered via line 92 from switch module 89 to client side screen 77. Therefore screens 73 and 77 display the same images since identical VGA data is transmitted simultaneously through lines 81 and 82.

During the dual mode, agent side screen 73 displays one set of images which corresponds to the VGA data delivered to input port 31, while client side screen 77 displays a second set of images, such as advertisement images, which correspond to the USB data delivered to input port 35. Monitor unit 74 comprises a USB bus through which USB data is transmitted. The USB bus includes segment 95 connecting control module 84 to switch module 89 and segment 96 connecting switch module 89 with client side screen 77. When the USB data received at input port 35 is video data, control module 84 transmits the USB data via bus segment 95 and further transmits a disable signal D via line 91 to switch module 89, in order to suppress the transmission of the VGA data received via line 82. Switch module in turn transmits the USB data via bus segment 96. To enable the generation of the second set of images of client side screen 77, a second video card is coupled to the motherboard of the computer.

The agent may select a desired mode of operation by depressing a predetermined key on his keyboard, or by depressing a selected button on a dedicated panel. The panel may also be provided with a button for deactivating one of the power supplies 86 and 87. Upon depressing this button, a suitable control signal N is transmitted to junction 94 whereby the selected power supply is deactivated. The panel or agent side screen 73 may be provided with a plurality of indication devices F-I, such as light emitting diode (LED) lamps, for indicating the current mode of operation and which screen is activated.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method of utilizing an existing network of interconnected computers at an establishment for advertising, comprising the steps of:
    a) providing an existing network of interconnected computers in data communication with a server for supplying establishment-specific information;
    b) coupling a multi-screened monitor unit to a corresponding computer of said network, said monitor unit having an agent side screen and at least one oppositely facing client side screen disposed on a common surface, a single video input port from a video graphics array (VGA) data port of said coupled computer, and a single input port from a universal serial bus (USB) data port of said coupled computer;
    c) installing a dedicated software module in each of said one or more of said computers, for generating advertisement images, for allowing interfacing operations with said coupled monitor unit, and for selectively directing information received from said server;
    d) enabling said server to access a database in which is stored a plurality of advertisement software packages;
    e) retrieving an advertisement software package from said database according to predetermined establishment related selection rules;
    f) transmitting said selected software package, together with said establishment specific information, to a target computer;

g) generating an advertisement image from said selected software package; and h) displaying, said advertisement image during a dual mode on a client side screen of the monitor unit associated with said target computer via said single USB input port while the agent interfaces with, and views other images on the agent side screen of said monitor unit associated with said establishment-specific information via said single VGA input port, wherein the agent selects a desired mode of said multi-screened monitor unit, including said dual mode, in an agent only mode whereby images are viewable on the agent side screen but not on the at least one client side screen, and a uniform mode whereby the agent side screen and the at least one client side screen display the same images associated with said establishment-specific information.

2. The method according to claim 1, wherein a request for an advertisement is carried out by the target computer by transmitting a request signal to the server.

3. The method according, to claim 2, wherein the request signal is generated by providing a proximity sensor in data communication with the target computer, detecting the presence of a client in the vicinity of an agent desk corresponding to the target computer, and transmitting a detection signal to the target computer.

4. The method according to claim 3, wherein the proximity sensor transmits the detection signal to the target computer after the client exits the agent desk and the target computer transmits a disable signal to the server whereby to terminate transmission of the selected software package to the target computer.

5. The method according to claim 2, wherein the request signal is generated by interacting with a pointing device coupled to the target computer.

6. The method according to claim 1, wherein an advertisement software package is retrieved from the database by an internal command of the server which is generated at a predetermined time.

7. The method according to claim 1, wherein the predetermined selection rules are defined by a representative of an establishment in which the network of computers are located.

8. The method according to claim 7, wherein the predetermined selection rules are changed by the agent after entering a code indicative of the nature of a meeting between the agent and a client.

9. The method according to claim 1, wherein the generated advertisement image is constantly viewed by the client on a selected region of a client side screen of the monitor unit.

10. The method according to claim 1, wherein the generated advertisement image is suppressed by the agent during a meeting, and is displayed only when the agent is engaged in another activity in which the client is not involved and requests by means of a pointing device that the generated advertisement image be displayed on the client side screen of the monitor unit.

11. The method according to claim 1, wherein each monitor unit of the network displays a different advertisement.

12. The method according to claim 1, wherein clients who are sitting in a waiting area view advertisement images displayed on the client side screen of a desired monitor unit.

13. The method according to claim 12, wherein the displayed advertisement images change after a client approaches an agent desk corresponding to the desired monitor unit.

14. The method according to claim 1, wherein the network is a local area network or a wide area network.

15. The method according to claim 1, wherein the monitor unit comprises two or three screens.

16. The method according to claim 15, wherein the agent side screen and the at least one oppositely facing client side screen are mounted in a common housing.

17. The method according to claim 1, wherein the monitor unit is operable in an agent only mode whereby images are not displayed on the at least one client side screen, a uniform mode whereby the agent side screen and the client side screen both display the same images, or in a dual mode, whereby the agent side screen displays images corresponding to received VGA data and the client side screen displays images corresponding to received USB data.

18. The method according to claim 17, wherein the agent selects whether the monitor unit operates in the agent only mode, in the uniform mode, or in the dual mode.

19. The method according to claim 18, wherein the USB data includes control and video data.

20. The method according to claim 19, wherein the monitor unit comprises:

i. a control module for controlling the flow of the USB data received from the target computer;

ii. a video splitter for receiving the VGA data from the target computer and for splitting the received VGA data into a first portion transmitted through a first line to the agent side screen and into a second portion transmitted through a second line; and iii. a switch module for selectively delivering video data received from said control module or from said video splitter via said second line to the at least one client side screen in response to the control data generated by said control module.

21. The method according to claim 20, wherein corresponding USB control data is transmitted to the control module following selection by the agent of a desired mode of operation.

22. The method according to claim 20, wherein a first USB segment extends from the control module to the switch module, and a second USB segment extends from the switch module to the at least one client side screen.

23. The method according to claim 22, wherein the control module generates a disable signal and transmits the same to the switch module during the agent only mode to suppress the transmission of the VGA data via the second line.

24. The method according to claim 23, wherein the control module generates the disable signal and transmits the same to the switch module during the dual mode, the USB video data being transmittable via the first and second USB bus segments to the client side screen.

25. The method according to claim 20, wherein the control module generates an enable signal and transmits the same to the switch module during the uniform mode to enable the transmission of the VGA data via the first and second lines simultaneously.

26. The method according to claim 1, wherein each of the one or more computers is provided with a network card and the software module of the target computer is operable to convert the retrieved software package into an advertisement image for display on the client side screen of the target computer.

27. The method according to claim 1, wherein the at least one client side screen is displaced with respect to the agent side screen.

28. The method according to claim 27, wherein the at least one client side screen is angularly displaced with respect to the agent side screen.

29. An advertising system utilizing an existing network of interconnected computers at an establishment, comprising:
  a) a server for supplying establishment-specific information via an existing network of interconnected computers at an establishment and further having access to a database in which is stored a plurality of advertisement software packages;
  b) said network of interconnected computers in data communication with said server, each of said computers being provided with a network card and with a dedicated software module for interfacing with a monitor unit; and
  c) a corresponding multi-screened monitor unit coupled to each of said computers, said multi-screened monitor unit having an agent side screen and at least one oppositely facing client side screen disposed on a common surface, a single video input port from a video graphics array (VGA) data port of said coupled computer, and a single input port from a universal serial bus (USB) data port of said coupled computer,
    wherein said server is configured to retrieve an advertisement software package from said database according to predetermined establishment related selection rules and to transmit said retrieved software package to the network card of a target computer, the dedicated software module of said target computer being configured to convert said retrieved software package into an advertisement image for display of said advertisement image on a client side screen of the monitor unit associated with said target computer,
    wherein said multi-screened monitor unit further comprises a control module for controlling the flow of USB control and video data received from said target computer, a video splitter receiving VGA data from said target computer and for splitting said received VGA data into a first portion transmuted through a first line to said agent side screen and into a second portion transmitted through a second line, a switch module for selectively delivering video data received from said control module or from said video splitter via said second line to said at least one client side screen in response to the control data generated by said control module, a first USB segment extending from said control module to said switch module, and a second USB segment extending from said switch module to the at least one client side screen,
    wherein said monitor unit is operable, upon selection by the agent, in an agent only mode whereby images are viewable on the agent side screen but not on the at least one client side screen, in a uniform mode whereby the agent side screen and the at least one client side screen display the same images associated with said received VGA data, or in a dual mode whereby the agent side screen displays images associated with said received VGA data and the at least one client side screen displays images associated with said received USB video data.

30. The system according to claim 29, wherein the multi-screened monitor unit further comprises means for selecting a desired mode of operation, corresponding USB control data being transmittable to the control module upon selection of the desired mode of operation.

31. The system according to claim 29, wherein the control module generates a disable signal and transmits the same to the switch module during the agent only mode to suppress the transmission of the VGA data via the second line.

32. The system according to claim 29, wherein the control module generates an enable signal and transmits the same to the switch module during the uniform mode to enable the transmission of the VGA data via the first and second lines simultaneously.

33. The system according to claim 29, wherein the control module generates a disable signal and transmits the same to the switch module during the dual mode, the USB video data being transmittable via the first and second USB bus segments to the client side screen.

\* \* \* \* \*